United States Patent [19]

Morfin-Alvarez

[11] 4,162,927
[45] Jul. 31, 1979

[54] APPARATUS FOR CRYSTALLIZING SUGAR SOLUTION AND MOTHER LIQUORS CONTINUOUSLY BY EVAPORATION

[76] Inventor: Rafael Morfin-Alvarez, Ingenio Independencia Martinez de la Torre, Veracruz, Mexico

[21] Appl. No.: 795,833

[22] Filed: May 11, 1977

Related U.S. Application Data

[63] Continuation of Ser. No. 607,730, Aug. 25, 1975, abandoned, which is a continuation-in-part of Ser. No. 401,465, Sep. 27, 1973, abandoned.

[30] Foreign Application Priority Data

Nov. 13, 1972 [MX] Mexico .................................... 139691

[51] Int. Cl.$^2$ ............................ C13F 1/02; C13F 1/12; B01D 9/02
[52] U.S. Cl. ........................................ 127/16; 127/61; 127/62; 422/245; 159/2 R; 159/25 R
[58] Field of Search ........................ 127/15, 16, 61–62; 159/16, 3, 2 R, 25 R, 26 R; 23/273 MT, 273 R

[56] References Cited

U.S. PATENT DOCUMENTS

| | | | |
|---|---|---|---|
| 1,982,978 | 12/1934 | Bonath | 159/25 R X |
| 2,129,864 | 9/1938 | Newkirk | 127/62 |
| 3,365,331 | 1/1968 | Miller et al. | 127/61 X |
| 3,424,221 | 1/1969 | Luce | 127/16 X |
| 3,554,800 | 1/1971 | Javet et al. | 127/16 |
| 3,627,582 | 12/1971 | Dambrine et al. | 127/16 |
| 3,680,621 | 8/1972 | Giorgi et al. | 127/16 X |
| 3,709,731 | 1/1973 | Kingmu | 127/62 X |
| 3,879,215 | 4/1975 | De Villiers et al. | 159/25 R X |
| 3,891,395 | 6/1975 | Winkler | 159/1 C X |

Primary Examiner—Michael S. Marcus
Attorney, Agent, or Firm—Ladas, Parry, Von Gehr, Goldsmith & Deschamps

[57] ABSTRACT

An apparatus for continuously crystallizing sugar, both by developing crystals from sugar solutions and by exhausting solutions of mother liquor from a massecuite, or cooked mass, by means of evaporation of said solutions over seed crystals, said apparatus comprising a hollow horizontal cylinder which in its upper portion and over its entire length has connected to itself along a slot a rectangular cover which thus forms a single body; means for heating the exterior of the hollow cylindrical body; means for producing a helicoidal movement in the mass being processed; means for connecting the hollow cylindrical body by means of the rectangular cover to a source of low pressure; means for feeding into the front end a controlled quantity of a solution of sugar or of a massecuite; means for feeding controlled replacement quantities of sucrose solution or of mother liquors to replace the water evaporated and the material crystallized, and to increase the volume of the mass being processed, and means for controlled discharge included in the rear end of the hollow cylindrical body.

6 Claims, 5 Drawing Figures

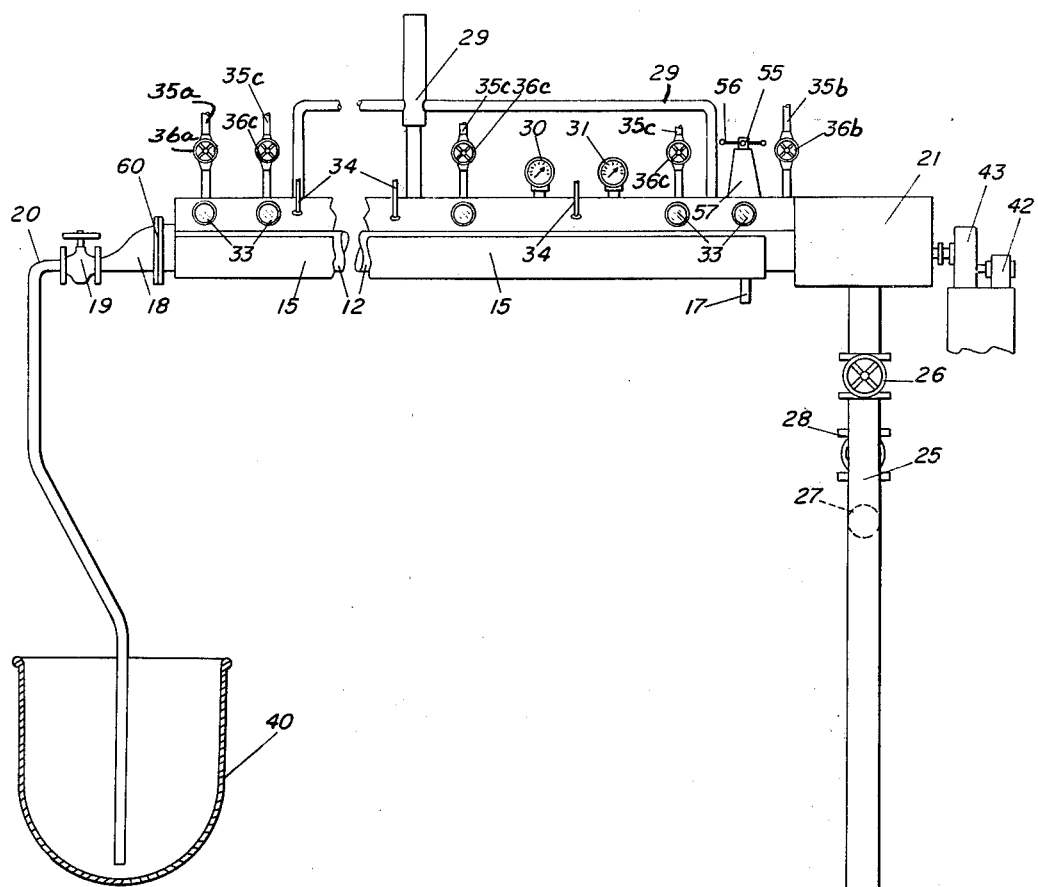
FIG. 2
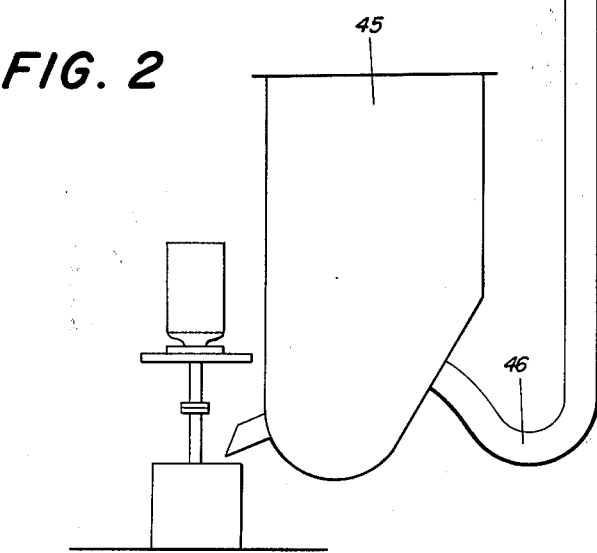

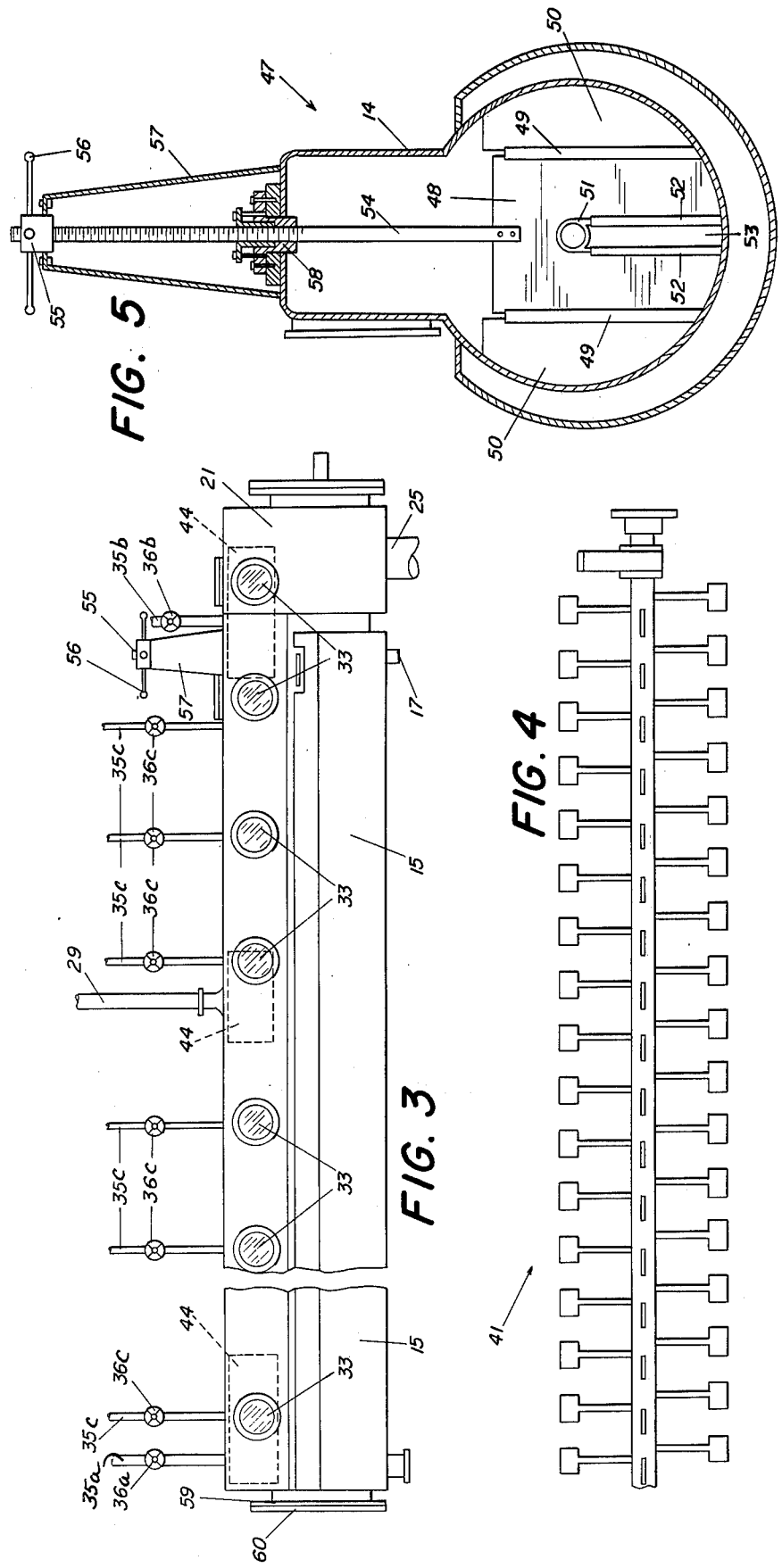

APPARATUS FOR CRYSTALLIZING SUGAR SOLUTION AND MOTHER LIQUORS CONTINUOUSLY BY EVAPORATION

CROSS REFERENCE

This is a continuation of my co-pending application Ser. No. 607,730 filed Aug. 25, 1975, now abandoned, which is in turn a continuation-in-part application of my co-pending application Ser. No. 401,465 filed Sept. 27, 1973, now abandoned.

BACKGROUND OF THE INVENTION

The crystallization of sugar in the mills which produce it is divided into two processes which are complementary and which are carried out with very different equipment one from another. The first process is performed by evaporation of a sugar solution, which crystallizes over seed crystals until it forms a mass of crystallized material, and the second process is carried out by cooling the massecuite (cooked mass) composed of crystals and mother-liquor so that the sucrose of the mother-liquors is deposited on the crystals, until the former are exhausted.

In the first process mentioned, in which crystallization is carried out by evaporation, the apparatus used at present, known as vacuum pans, present a large number of drawbacks from the point of view of yield and operation.

One such drawback is that the mass being processed is concentrated by evaporation in the vacuum pans until it reaches the zone of super-saturation known as the metastable zone, in which the quantity of sucrose contained in the solution is greater than that contained in a saturated solution, and that is the moment at which seed crystals are seeded to accomplish the crystallization of the sugar solution. Nevertheless, the meta-stable zone is limited at the top by a solution of a concentration in which new nuclei of crystals form spontaneously, and at the bottom by a solution which first reaches saturation and then becomes unsaturated with the crystals dissolving again into the solution. Consequently within the meta-stable zone there prevail different speeds of crystallization due to the different concentrations appearing at the same temperature; this situation causes the crystals to develop differently, if the mass is not maintained uniformly in process, and the product contained will be made up of crystals of different sizes, which is undesirable.

Another disadvantage is that when there is an excess of mother liquors, upon increasing the concentration of the mass in process (i.e. the mass undergoing crystallization) by evaporation there is the danger that undesirable new crystals known as false grains will form. Likewise, in the vacuum pans the mass cannot be processed in high concentrations because it would tend to clog; therefore the processing is done in low concentrations, and consequently the speed of crystallization is low requiring an extended processing time with a greater expenditure of energy.

Finally, because of the shape of the vacuum pans and because movement of the mass being processed in them is generally effected only by boiling, the concentration of sucrose in the mass at discharge is not optimum, causing low recovery and thus requiring a greater recirculation of mother liquors.

On the other hand, the process of crystallization by cooling also has several drawbacks in comparison with the process of crystallization by evaporation. Thus to carry out the process of exhaustion of the mother liquors of a cooked mass (massecuite) in which the quantity of sucrose which crystallizes is on the order of 10%, from twice to six times as much time is required as in the process of crystallization by evaporation, in which a large quantity of sucrose is deposited by crystallization upon the crystals in less time. Furthermore, when there is an excess of mother liquors in a cooked mass, upon cooling it to bring about crystallization, thereby to exhaust the said mother liquors, new crystals of false grains are produced.

In addition, the equipment in which this process of crystallization by cooling is carried out is very large, hence expensive, difficult for maintenance and of low efficiency.

SUMMARY OF THE INVENTION

In consideration of the foregoing, it is one object of the present invention to provide a method and an apparatus for continuous crystallization by evaporation of both sugar solutions and mother liquors. That is, to carry out in a single apparatus the two different processes of crystallization, the equipment for which is very simple because it works with a positive flow pattern, and furthermore is of high capacity and of small size and weight.

Likewise, by means of the present invention the efficiency of crystallization is improved, because the process is carried out at very high concentrations, handling product masses in which percentage recovery in crystals is over 60%, achieving an optimum speed of crystallization and maintaining a suitable medium for the optimum development of the crystals.

The present invention is accomplished in an apparatus for continuous crystallization by evaporation in which the entire mass in process is boiling, activated by a helicoidal movement; and its rate of boiling is increased by feeding in sugar solutions or mother liquors which have lower boiling points than the mass in process, and in which optimum concentrations are maintained to obtain the highest speeds of crystallization; that is, an apparatus including means for producing agitation with helicoidal movement in the mass in process, means for feeding in solutions of mother liquors or solutions of sugar in a controlled manner to replace the material crystallized and the loss by evaporation, and to increase the volume of solution in the mass in process, means for maintaining control over filling and discharge, means for heating the exterior of the apparatus and means for connecting a source of reduced pressure.

These and other objcts to be achieved through the use of this invention will be better understood and more clearly appreciated upon reading the following description which refers to the drawings of the preferred embodiment of the present invention.

DESCRIPTION OF THE DRAWINGS

FIG. 2 is a schematic view illustrating the incorporation of the apparatus of the present invention in a sugar mill.

FIG. 3 is a view in side vertical elevation illustrating the apparatus of the present invention.

FIG. 4 is a view in side vertical elevation of the means for supplying the helicoidal movement to the mass in process in the apparatus of the present invention, the means for which are shown cut away.

FIG. 5 is a view in conventional lengthwise cross-section to illustrate the portion of the apparatus of the present invention in which is included the gate which controls the discharge and the filling level of the apparatus.

DETAILED DESCRIPTION OF THE INVENTION

Figure 1:
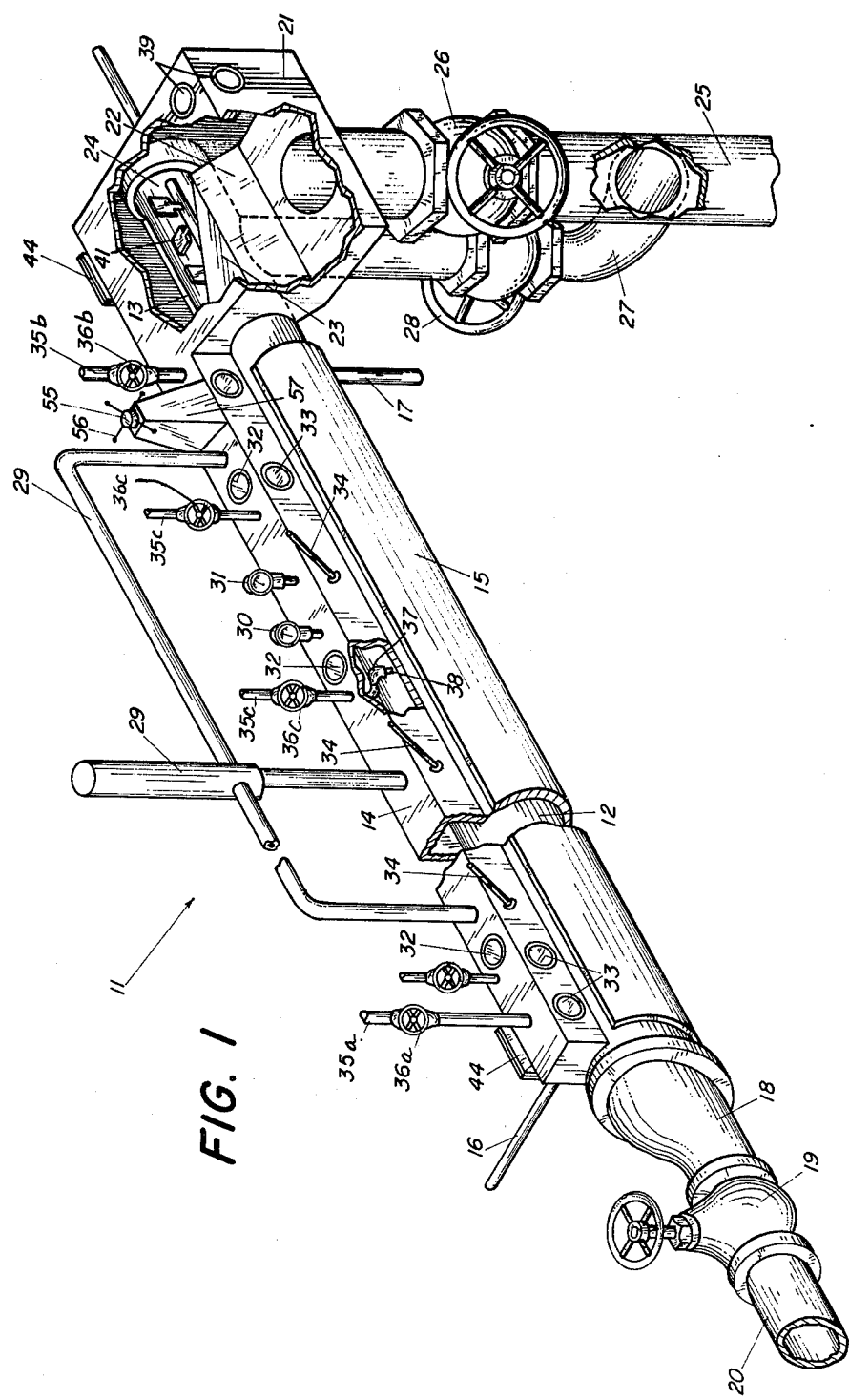
FIG. 1 is a perspective view of the apparatus of the present invention for crystallizing sugar.

The present invention refers to equipment for sugar mills, and specifically to an apparatus for continuous crystallization of sugar 11.

This apparatus for crystallization 11 is composed of a hollow cylindrical body 12 which includes an upper slot 13 extending the entire length thereof, said upper slot 13 being covered by a rectangular cover 14 which acts as a space for vapors.

The hollow cylindrical body 12 also includes a jacket 15 covering its entire length by means of which the required heating is supplied to evaporate the quantity of water from the mass in process. This is accomplished by introducing steam into the jacket 15 by means of pipe 16, said steam once condensed being eliminated by means of pipe 17 for condensate.

In addition, the hollow cylindrical body 12 has an inlet end which is open and continuously connected by means of eccentric reduction 18 and feed regulating valve 19 to feed pipe 20.

The end portion of cylindrical body 12 opposite the end having feed pipe 20 is the discharge portion for processed material. The extreme end of this portion is closed and on one side has an overflow discharge box 21, which is joined on one of its ends to rectangular cover 14 and that portion of it which coincides with the hollow cylindrical body 12 is joined thereto by means of slide 22 and triangular plate 23 which forms in combination with slot 13 an overflow port 24. The upstream portion of this overflow port, i.e. the portion nearer the feed pipe 20, is narrower than the downstream portion thereof, i.e. the portion further from the feed pipe 20, so that the overflow port 24 has an inclined edge and its portion of greatest flow is toward the closed end of the discharge portion.

Overflow discharge box 21 is connected at its underside to a discharge pipe 25 in which there is a discharge regulating valve 26 which is placed in position near said overflow discharge box 21.

Hollow cylindrical body 12 also has in the lower part of its discharge portion an orifice to which is attached a discharge tube 27 of smaller diameter than discharge tube 25, and which also has a corresponding valve 28. The discharge tube 27 is also interconnected with discharge pipe 25 at a point below the discharge regulating valve 26.

Within hollow cylindrical body 12, at a point therein near overflow discharge box 21, there is a barrier 47 which is properly speaking the first part of the discharge portion of the apparatus.

As shown in FIG. 5, barrier 47 is composed of a gate 48 which can be slid upward and downward in rails 49 which are secured by plates 50 to hollow cylindrical body 12.

Plates 50 are secured in diametrically opposite portions of hollow cylindrical body 12 corresponding to its lateral walls, and said plates 50 are so placed that when gate 48 is fully lowered to the bottom of hollow cylindrical body 12 they are at the same height as said gate 48 (see FIG. 5). Gate 48 has an elongated opening 51 in its central portion, which extends approximately from its middle to its distal end, the edges of the gate that bound said elongated opening 51 being slidable in rails 52 which are fixed to hollow cylindrical body 12 by means of plate 53 secured to the bottom of said hollow cylindrical body 12.

To actuate gate 48 suitable means are provided which may be a shaft 54 having one end mounted in gate 48 and the other end secured to a nut 55 with its respective wrench handle 56, said nut 55 being mounted on rectangular cover 14 by means of bracket 57 and said shaft 54 being connected to rectangular cover 14 by its respective bearing 58.

In order to control all conditions of operation, the apparatus for crystallizing 11 includes different control elements. A conventional condenser (not shown) is connected to the body 12 by means of lines 29 to produce pressure and vacuum inside of hollow cylindrical body 12. In order to control the pressure and vacuum produced inside the body 14, a pressure gauge 30 and a vacuum gauge 31 are included on rectangular cover 14.

To observe the flow and the concentration of mass in process within hollow cylindrical body 12, upper sight slots 32 and side sight slots 33 are provided, located at regular intervals along rectangular cover 14; other slots also located at regular intervals along rectangular cover 14 permit the insertion of probes 34 with which samples are taken directly in order to manually measure the concentration; finally, distributing pipes for water or a desired solution are also located at regular intervals along rectangular cover 14 coinciding with sight slots 33. The distributing pipe that is nearest the inlet end of the cylindrical body 12 is denoted 35a, the distributing pipe that is furthest from the inlet end is denoted 35b, and the distributing pipes that lie between the pipes 35a and 35b are denoted 35c. The pipes 35a, 35b and 35c are provided with respective control valves 36a, 36b and 36c. The distributing pipes and their control valves are referred to hereinafter generally as pipes 35 and valves 36. The distributing pipes 35 are used for regulating the concentration of the mass in process by opening or closing valves 36 connected thereto and thereby adding water or sugar solution to the mass in process or ceasing the addition of water or sugar solution.

The regulation of concentration above referred to is of the visual control type because distributing pipes 35 are located in such a manner that the portion coincident with lateral sighting slots 33 ends in an elbow 37 and a reduction 38. Thus, upon detecting that regulation of the concentration is required, admission of water or of a desired solution into the interior of hollow cylindrical body 12 is effected by opening valves 36 of distributing tubes 35, and the delivery of liquid through said distributing tubes into the inside of the crystallizing apparatus 11 is observed through lateral sight slots 33 so that when once the water lost by evaporation has been replaced said valves can be closed again.

In the event of such observation at night, light is introduced through upper sight slot 32, which permits of judging adequately the delivery from distributing pipes 35, as above described, by means of lateral sight slot 33.

Overflow discharge box 21 has its sight slots 39, upper and lateral, like those of rectangular cover 14, through which control observation can be made of the interior of the overflow discharge box 21.

In addition to the foregoing, hollow cylindrical body 12 includes in its interior throughout its entire length a paddle carrier 41, which is driven by motor 42 (FIG. 2) and variable speed reducer 43. This paddle carrier 41, illustrated in detail in FIG. 4, has the paddles located perpendicularly on the shaft and distributed around said shaft in a helicoidal array, such that the tangential velocity which is transmitted to the mass in process is 60 times greater than the lineal velocity, whereby it gives to the equipment and to the process conducted therein the appropriate characteristics for time of residence for the mass in process.

The crystallizing apparatus 11 is connected to the usual equipment in sugar mills by means of said feed lines 20 which are connected to a reservoir of mass for processing 40, in which the cooked mass is generally placed, and also by means of discharge tube 25 which is connected to a centrifuge mixer 45 having a hydraulic seal 46, whereby an equilibrium vacuum is maintained in crystallizing apparatus 11.

It should also be noted that the said paddle carrier 41 does not interfere with the crystallizing apparatus 11 because the paddles are located in such a way in the inside of hollow cylindrical body 12 that they do not interfere with probes 34. Furthermore, the shaft which carries said paddles is supported by pillowblocks which can be easily removed from their mountings because openings 44 (FIGS. 1 and 3) are incorporated into the corresponding end portions of hollow cylindrical body 12 for the purpose of performing any required maintenance work.

While the foregoing description is drawn to a specific embodiment of the invention, it will be understood by those versed in the subject matter that any changes in form and detail are comprehended within the scope and coverage of this invention.

Now then, as above stated, the apparatus herein above described accomplishes the two operations of crystallization carried out in a sugar mill, that is, a first process in which, the growth of the crystals takes place by evaporating a feed solution of sucrose and a second process which consists of the re-treating of a cooked mass, in which the crystal grows by drawing sucrose from the mother liquors until they are exhausted.

For the first process, the apparatus of the present invention does not need to use the eccentric reduction 18, regulating valve 19, nor feed line 20, since feeding the sucrose solution which is to be crystallized will be carried out by the distribution pipe 35a, and regulation thereof is accomplished by means of valve 36a. Accordingly, the feed end of the apparatus will be closed by means of a cover 59 (FIG. 3) secured by a flange 60.

The operation proper for the first crystallization process consists of reducing the pressure in the apparatus 11, and thereafter feeding an initial charge of sugar solution into the body 12 up to the level of the upper edge of the jacket 15. Once the hollow cylindrical body 12 is full, discharge valves 26 and 28 are closed, gate 48 is lowered, movement of the paddle carrier 41 is begun and steam is applied to jacket 15, thereby initiating evaporation until reaching the supersaturation specified. Thereafter seed (comprising developing crystals) suspended in sugar solution fed into the body 12 by the first distribution pipe 35a. Subsequently sucrose solution is supplied by means of the distributing pipe 35c, while regulating this delivery by means of corresponding valves 36c, with the object of maintaining the condition of supersaturation. The solution supplied through the pipes 35c has a lower boiling point than the mass being processed; said solution, when compelled by elbows 37 and reductions 38 to fall into the upper part of said mass being processed, is forcibly drawn by the rotational movement of the paddle carrier and placed in contact with the hot wall of the hollow cylindrical body 12, thus producing more active boiling in that zone which in turn favors the rotation and mixing of the mass being processed.

In the manner above described crystallization is accomplished from a sucrose solution upon seed crystals which are developed in a continuous process of evaporation and crystallization, as a consequence of which process the seed grows and as the crystals move to the discharge end the proportion of the volume occupied by the growing crystals increases, reducing the quantities of mother liquors, thus tending to form the cooked mass. Likewise the concentration of the mass being processed is building up from the feed portion to the discharge portion, since the crystals in the process increase in size and the available area of crystal surface diminishes per unit of volume of the cooked mass; however said reduction of surface area is compensated for in that as the concentration increases the speed of crystallization increases also and evaporation diminishes as heat transmission drops off due to the increase in concentration.

As is logical, when the operation is begun, the first product mass does not have its crystals in the condition required, and it is necessary to dissolve it for recirculation through the process, which is done by opening valve 26 to discharge the said product mass.

Once the first product mass has been eliminated, it is possible to eliminate through discharge valve 26 only such a quantity as is proportional to feed in order to maintain a consistent full volume in the equipment. Thus the product mass which is obtained and which overflows barrier 47 has a high percentage of crystals and consequently has low fluidity. Accordingly, fluidity must be restored to facilitate continuous discharge; this is done by means of an operation called "beating", that is, feeding in the mother syrup without dilution and at its saturation point (said mother syrup is obtained by centrifuging the mass) through the distributing pipe 35b, regulating its flow with the corresponding valve 36b. This infeed of undiluted mother syrup at its saturation point is complemented by breaking up the lumps which may form by means of the paddles of the paddle carrier 41, thus fluidizing the product mass. Once the product mass is fluidized, it is forced to discharge through slot 13 to the overflow discharge box 21, which maintains a filling level lower than that of hollow cylindrical body 12, and from here it passes to discharge tube 25. Consequently, it can be stated that the product mass which is discharged through discharge tube 25 is in optimum condition, in which the crystals represent a high percentage of the mass, thus leading to high recovery; furthermore these crystals can be obtained in any desired size.

To interrupt the process if desired, valve 36a of first distributing tube 35a, through which seed suspended in solution is fed, is closed, thus discontinuing the supply of seed and when the mass no longer flows over barrier 47, gate 48 is gradually opened permitting the flow of crystals already grown, which are discharged by means of discharge tube 27, and valves 36b and 36c of the other distribution pipes 35b and 35c are progressively closed when the crystals no longer exhibit the conditions desired for recirculating the syrup obtained. Thus the equipment of the present invention can always be wholly emptied.

When the apparatus of the present invention 11 is operated by the second process, that is, to crystallize sucrose from the mother syrup upon the crystals of the cooked mass, it does not use the overflow discharge box 21, but instead discharge is effected through discharge tube 27. In this case, feed tube 20 will be used, with regulating valve 19 and eccentric reduction 18, since in this way by linking the hollow cylindrical body 12 with the feed tube 20 the flow of material to be processed is considerably aided because it travels in the same direction and when it enters through the lowest portion of the equipment it can also be carried to more distant points. FIG. 2 shows schematically how the apparatus 11 is operated by this second process.

Operation by the second crystallization process as such is started by establishing the condition of reduced pressure in the hollow cylindrical body 12 and rectangular cover 14, so that the pressure is equal to that used in the production of the mass to be processed. Then the paddle carrier 41 is set in motion to produce a helicoidal movement; mass to be processed is fed into hollow cylindrical body 12 by means of tube 20 and valve 19 is operated in a continuous and regulated manner to fill hollow cylindrical body 12, in such a manner as to leave rectangular cover 14 free since it is the space for the vapors produced. Steam is supplied to jacket 15 by tube 16, maintaining a pressure of 8 psi in this jacket. Meanwhile the paddles of the paddle carrier 41 induce a helicoidal movement in the mass as soon as it is fed in, with a tangential velocity 60 times greater than the linear velocity, thus producing energetic rotation and a slight translational effect.

As a consequence of the foregoing, the rotation of the mass in helicoidal movement wthin the hollow cylindrical body 12 increases the heat transmission; the boiling produced builds up the rotation, because the rotating mass, when it is submerged, begins to receive the heat transmitted to the jacket 15 through hollow cylindrical body 12, and the bubbles which form are pulled by the speed of rotation, which is greater than the speed of ascent of said bubbles; as the mass emerges continuing its rotational movement, the entire volume of bubbles comes out, thus increasing the rotation and agitation, so that the entire mass is boiling and the mother liquor tends to become super-saturated, producing an excess of sugar which is deposited on the surface of the crystals. The super-saturation by concentration from evaporation is maintained in controlled condition by feeding in mother syrup solution continually and in a controlled manner, by means of the distributing pipes 35 controlled by the valves 36; as the concentration of the mass increases gradually toward the discharge, the crystallization of the sucrose continues at the expense of the mother syrup until the latter is exhausted. By means of the slots for probes 34 and the inspection slots 33 the material in process is inspected; when gate 48 is lowered it forms, along with panels 50 which are complementary to it, barrier 47, which regulates the fill and discharge level.

To stop the process, feed valve 19 is closed, paddle carrier 41 maintains its discharge rate over barrier 47 until the level of the material drops so far as to prevent overflow; feed valves 36 are successively closed, and gate 48 is raised, the steam valve is closed, and movement of saddle carrier 41 is only stopped when the last portion of the product mass has passed out.

It will be understood from the foregoing that the paddle carrier 41 acts to drive the mass in process along the interior of the body 12. The paddle carrier maintains a positive flow pattern, that is it ensures that the mass moves continuously within the body 12 towards the discharge portion.

In order to illustrate more clearly the results of the method and the apparatus of the present invention, the following examples of operation are supplied.

EXAMPLE 1

Operation to accomplish crystallization by evaporation of the mother syrup over crystals of the mass in order to obtain exhaustion of the syrup.

|  |  | 1 | 2 | 3 | one week average |  |
|---|---|---|---|---|---|---|
| I. Feed material | Cooked Mass "C" Brix | 98.20 | 98.20 | 96.90 | 97.90 |  |
|  | Sucrose | 58.04 | 57.45 | 60.25 | 59.11 |  |
|  | Apparent Purity | 59.10 | 58.15 | 62.18 | 60.38 |  |
|  | Mother syrup from Cooked Mass "C" | 38.90 | 38.26 | 41.40 | 40.90 | A |
| II. Replacement material | Solution of Mother Syrups | Brix | 42.00 | 42.00 | 50.00 | 42.00 |
|  | Apparent Purity | 32.11 | 31.20 | 33.90 | 34.50 |  |
| III. Product | Final Syrups Brix | 94.20 | 95.05 | 93.90 | 94.20 |  |
|  | Sucrose | 30.25 | 28.80 | 32.11 | 32.37 |  |
|  | Apparent Purity | 30.30 | 30.30 | 34.20 | 34.35 | B |
|  | Exhaustion in Purity of Mother Syrups A-B | 6.79 | 7.96 | 7.20 | 6.40 | A-B |
|  | Residence time of material in process, in minutes | 40 | 45 | 40 | 40 |  |
|  | Tons of meat processed per hour | 13.1 | 12.3 | 13.1 | 13.1 |  |

Accordingly, in this process there are no non-boiling zones caused by regions of high hydrostatic pressure in the material producing pressures and preventing boiling; by means of the mechanical helicoidal movement the boiling is stimulated and it is possible to process the material in high concentration in which the speed of crystallization is optimum, with equipment as follows:
 (1) Diameter of the cylindrical body is 24": the mass which is momentarily at the bottom of the cylindrical body is subjected to a hydrostatic load of 24"–60 centimeters, thus assuring that the entire mass is boiling.

(2) Length of the hollow cylindrical body is 60'.
(3) Steam jacket covering 275 sq. ft. of the cylindrical body.
(4) Employing 10 HP supplied by motor.
(5) The mass having a tangential velocity of 63 feet per minute.
(6) With a capacity of from 12 to 15 tons/hour.

The following results were obtained:

|  | Cooked Mass or Bx | Sucrose | Apparent Purity |
|---|---|---|---|
| Analysis of the cooked mass, infeed | 96.20 | 61.71 | 64.15 |
| Purity of the mother syrup of the mass at infeed |  |  | 40.80 |
| Analysis of final syrup in centrifuge | 94.60 | 31.39 | 33.18 |
| Exhaustion in apparatus | 40.80 | 33.18 | 7.62 |
| Residence time of material in process |  |  | 1 hour |
| Operation in continuous flow: Result, 58% crystal in cooked mass. |  |  |  |

I claim:

1. An apparatus for continuously crystallizing sugar by evaporating liquid under vacuum from a highly concentrated mass, comprising a horizontal, elongated, hollow, cylindrical vessel for receiving the mass to be processed, the vessel having a slot extending completely along its upper wall and also having a feeding end and a discharge end; a rectangular cover coupled to the vessel and defining a vapor chamber which communicates with the interior of the vessel by way of said slot; a steam heating jacket located around the vessel for heating the interior thereof; means for imparting a helicoidal movement to the mass in process, said means for imparting a helicoidal movement comprising a shaft disposed within the vessel and extending along substantially the entire length thereof, means mounting the shaft within the vessel so as to extend substantially along the central axis thereof and to be rotatable within the vessel about the longitudinal axis of the shaft, drive means connected to the shaft to bring about rotation of the shaft about the longitudinal axis thereof, and a plurality of paddle members secured to the shaft and each having a blade extending substantially radially of the shaft to a position adjacent the interior surface of the vessel; means for adding liquid to the mass in process in order to control the concentration of the mass, said means for adding liquid comprising a multiplicity of tubes for distribution of liquid coupled to the vessel through the rectangular cover at regularly spaced intervals along the upper portion of the rectangular cover, elbow couplings connected to the distribution tubes, reduction tubes connected to the distribution tubes by the elbow couplings and extending perpendicular to the central axis of the hollow cylindrical body, and sight holes laterally located at regularly spaced intervals along said rectangular cover, in line with said reduction tubes; means located near the discharge end of the vessel for regulating the level to which the vessel is filled by the mass in process, said level regulating means comprising a barrier slidingly coupled to the hollow cylindrical body near its discharging end and means located on said rectangular cover for actuating said barrier; feeding means and feeding control means coupled to the feeding end of the vessel; and discharging means and discharge control means coupled to the discharge end of the vessel.

2. The apparatus of claim 1, wherein said feeding and feeding control means comprises a feeding tube aligned with the hollow cylindrical body; an eccentric reduction and a regulating valve coupling said feeding tube to the hollow cylindrical bodies feeding end.

3. The apparatus of claim 2, wherein said discharging means and discharging control means comprises a substantially rectangular overflow discharging box coupled by one of its sides to said discharging end of the hollow cylindrical body and integrally coupled by one of its bases to the rectangular cover and by the other of its bases through an orifice to a first discharging tube including a regulating valve; and a second discharge tube including a regulating valve, which second discharge tube is coupled through an orifice by one of its ends to the lower portion of the discharging end of the hollow cylindrical body and by its other end to said first discharging tube in a portion below the corresponding regulating valve.

4. The apparatus of claim 3, wherein said overflow discharging box includes a triangular plate in said one of its sides coupling same with said discharging end, in such a way as to allow a greatest discharge to flow through the portion nearest the end of said hollow cylindrical body.

5. The apparatus of claim 1, wherein said feeding means and feeding control means comprises a first tube for distribution including a regulating valve and a cover closing the feeding end of the hollow cylindrical body.

6. The apparatus of claim 5, wherein said discharging means and discharging control means are the second discharge tube and its corresponding regulating valve.

* * * * *